Patented June 16, 1936

2,044,204

UNITED STATES PATENT OFFICE 2,044,204

PROCESS OF MAKING MOLDED CEMENTITIOUS MATERIALS

Bryan F. Brice and Paul B. Brice, Cook County, Ill.

No Drawing. Application April 28, 1936,
Serial No. 76,821

8 Claims. (Cl. 18—47.5)

The object of this invention is to provide a novel process for making molded cementitious bodies. Such compositions may be molded into various forms such as panels and other shapes, and although made from constituent elements which are readily obtainable and low in cost, are of great strength and durability and adapted to a wide variety of uses. The new product is substantially non-hygroscopic and is also dielectric in nature. It therefore is especially suitable for use as panelling for the mounting of electrical instruments.

A compressed, molded composition of matter having the foregoing characteristics may be made from the following materials: For the cementitious base, an ordinary Portland cement of standard grade has been found to be satisfactory. We have discovered that blast furnace slag constitutes a suitable filler for the composition when the slag is pulverized to uniform grading in size of its particles. Blast furnace slag is inert and therefore does not interfere with the reactions involved in the making of the composition; moreover, being a waste product, it is very low in cost, yet easily obtainable in large quantity. The use of blast furnace slag as a filler enables a composition of superior quality to be made and sold at a low price. It has been found advantageous to employ pulverized blast furnace slag of different size gradings, for example, suitable proportions as hereinafter described, of blast furnace slag pulverized to 100 mesh fineness and of blast furnace slag pulverized to 40 mesh fineness. The constituent elements of the binder are preferably asbestos for the fibrous material, and gilsonite for the hydrocarbon adhesive because of its relatively high melting point, namely, about 300° F. As hereinafter stated, it is desirable to employ a mixture of relatively short fine fibered asbestos and long fibered asbestos.

Describing a specific process in accord with the invention, for making the foregoing composition of matter: In carrying out the process, it is advantageous to mix the constituent ingredients of the composition in separate batches in suitable mixing vessels. For example: one batch comprising the hygroscopic element of the mixture, may be composed of 6 lbs. of Portland cement, U. S. Government standard grade and 2¼ lbs. blast furnace slag pulverized to 100 mesh fineness which are thoroughly mixed with 24 oz. of water, said amount of water being in excess of the theoretical amount required to effect complete hydration of the given quantity of cement. Only by the use of excess water can the colloidal process involved in the combination of the water with the cement be rapidly completed throughout the mass of cement particles.

The other batch comprising the amorphous elements of the mixture, is composed of the constituent ingredients which serve to bind the mass of the final composition and to fill the voids which form in the mass during the evaporation of the excess water used to effect complete hydration. In the specific example given, there is employed for the fibrous material a mixture of short and long fibered asbestos composed of ¾ lb. of fine short fibered asbestos and 1¾ lb. of long fibered asbestos, and for the hydrocarbon adhesive 1¼ lb. of gilsonite. To the foregoing, it has been found advantageous to add 6 oz. of heat flowing resin having a melting point of about 150° F., 6 oz. of turpentine and 3 oz. of China-wood oil.

The resin functions as a flux for the gilsonite in the final stage of the process which involves the distribution of the binder through the mass, and also serves to promote cohesion between the gilsonite particles, as well as to impart a superior, glossy finish to the composition when molded. The turpentine is used primarily to promote emulsification of the resin in the preliminary mixing stage. The China-wood oil serves as a lubricant in the handling of the mixture and imparts a lubricating film to the final product insuring its removal from the mold without sticking. The foregoing materials are thoroughly mixed in a suitable vessel to form as homogeneous a mass as possible. As materials used in the foregoing batch are amorphous, as distinguished from the cementitious material in the batch first mentioned, these materials, in addition to the binding effect on the cement, render the molded article substantially non-hygroscopic. This is an important consideration in many articles formed of the novel composition.

Having prepared the separate batches of the constituent ingredients of the composition in accord with the manner previously described, the two batches are combined and thoroughly mixed together. If it be desired to make panel board from the composition, for example, dielectric board of the type commonly known as "ebony board", the composition from the last mixing stage may be extruded, or rolled into sheet form, previous to the final stage of the process.

The final stage of the process involves the application of heat and pressure to sheets of the desired size cut from the sheet of composition material after passing through the rollers, to consolidate the material into the compressed homogeneous board. This stage involves the combined use of three factors, namely, (1) the application of pressure intermittently to the composition which is confined in sheet form in a suitable press, (2) the application of external heat and (3) the control of the applied temperature to produce in the confined mass an internal temperature above the vaporization point of the excess uncombined water used in the hydration of the cement, and approximating but not substantially above the melting point of the hydrocarbon adhesive employed as a constituent element of the binder.

In the instance of the use of gilsonite as the hydrocarbon element, the internal temperature in the composition material as the pressure is applied should be elevated to about 300° F. which is substantially equal to the melting point of the gilsonite. However, the temperature should never be raised to a point high enough to break down the cement colloid. Under the concurrent conditions of external heat, pressure, and the internal heat in the composition material, the excess uncombined water is vaporized and converted into steam which is allowed to pass out of the mass of composition material.

Due to the temperature developed internally in the mass of composition material, which is confined under pressure, the water vapor arising from the excess water of hydration under pressure is superheated. The condition of superheated steam under pressure throughout the mass of material places the cement particles under pressure, thereby accelerating penetration of the cement particles by the water and promoting complete hydration or conversion of the cement into colloidal form. The turpentine used as a solvent for the resin is largely vaporized and driven off, but the China-wood oil remains in the mass. As the excess uncombined water is driven off, the hydrated cement shrinks in volume and is consolidated into a dense hard mass. The shrinkage in volume of the cement causes minute voids or fissures to occur in its structure, and other voids or fissures occur throughout the mass as an incident of the evaporation of the excess water. These voids or fissures are filled with the slag and the binding material comprising the asbestos and gilsonite, the latter flowing through the mass because of the maintenance of an internal temperature as high as the melting point of the gilsonite.

The flow of the gilsonite is promoted by the resin of relatively low melting point, 150° F., which has become liquefied due to the internal much greater temperature of 300° F. In the pressing or molding stage of the process of making the board, the pressure and internal temperature are increased gradually with intervening intervals of relatively released pressure, thereby providing breathing intervals which allow the vapor resulting from evaporation of the excess water to escape from the mass in the press. This operation is continued with gradual increase of pressure until there is no apparent further escape of vapor, at which time the final pressure is applied and the final internal temperature is developed. The final temperature and pressure are applied to the material until it has been consolidated into a compact, compressed homogeneous mass.

After the final pressure has been applied, the finished composition material in the press is rapidly cooled before removing it from the press. This may be accomplished by shutting off the steam in the press and running cold water through the steam channels of the press, in a manner well understood in the art of molding composition materials. When cooled the board may be removed without sticking from the press by reason of the China-wood oil in the composition, which provides ample surface lubrication for the board. The completed panel board is constituted of a compact hard homogeneous mass of great tensile and shear strength. Because of its dielectric quality, the board is especially suitable as a mounting for electrical instruments. The board is substantially non-hygroscopic and it has the further advantage that it does not require a long curing process after removal from the press, but is immediately available for use, upon cooling.

The invention as hereinabove described may be variously embodied within the scope of the claims hereinafter made.

1. The process of making molded cementitious bodies which consists in forming at ordinary atmospheric temperature an intimate admixture containing a cementitious base, water in an amount in excess of that required to effect complete hydration of said cementitious base, an inert filler, fibrous material and a pulverized solid hydrocarbon having a melting point in excess of 212° F., the proportion of hydrocarbon in the admixture being less than 30% of the total mass, subjecting a confined mass of such admixture to gradually increasing heat and pressure in an amount adequate to elevate the internal temperature of said confined mass to a point above the boiling point of the water to convert the uncombined excess water into vapor which by penetration under pressure of the cementitious particles effects substantially complete hydration of the cementitious base while the confined mass is undergoing the pressing operation, and maintaining such application of heat and pressure until the uncombined excess water is driven off from the mass and said mass attains a final temperature not less than the melting point of the hydrocarbon and is consolidated into a compact homogeneous non-hygroscopic solid in which the cementitious base is substantially completely hydrated at the conclusion of the pressing operation and free from uncombined water and the hydrocarbon penetrates the voids in said cementitious base resulting from its hydration.

2. The process of making molded cementitious bodies which consists in forming at ordinary atmospheric temperature an intimate admixture containing a cementitious base, water in an amount in excess of that required to effect complete hydration of said cementitious base, an inert filler, fibrous material and a pulverized solid hydrocarbon combined with a resinous flux and said combination having a melting point in excess of 212° F., the proportion of hydrocarbon in the admixture being less than 30% of the total mass, subjecting a confined mass of such admixture to gradually increasing heat and pressure in amount adequate to elevate the internal temperature of said confined mass to a point above the boiling point of the water to convert the uncombined excess water into vapor which by penetration under pressure of the cementitious particles effects substantially complete hydration of the cementitious base while the confined mass is undergoing the pressing operation, and maintaining such application of heat and pressure until the uncombined excess water is driven off from the mass and said mass attains a final temperature not less than the melting point of the hydrocarbon and is consolidated into a compact homogeneous non-hygroscopic solid in which the cementitious base is substantially completely hydrated at the conclusion of the pressing operation and free from uncombined water and the hydrocarbon penetrates the voids in said cementitious base resulting from its hydration.

3. The process of making molded cementitious bodies which consists in forming at ordinary atmospheric temperature an intimate admixture containing a Portland cement base, water in an amount in excess of that required to effect complete hydration of said cement base, an inert filler, fibrous material and pulverized gilsonite, the proportion of gilsonite in the admixture being less than 30% of the total mass, subjecting a confined mass of such admixture to gradually increasing heat and pressure in amount adequate to elevate the internal temperature of said confined mass to a point above the boiling point of the water to convert the uncombined excess water into vapor which by penetration under pressure of the cement particles effects substantially complete hydration of said cement base while the confined mass is undergoing the pressing operation, and maintaining such application of heat and pressure until the uncombined excess water is driven off from the mass and said mass attains a final temperature not less than the melting point of the gilsonite and is consolidated into a compact homogeneous non-hygroscopic solid in which the cement base is substantially completely hydrated at the conclusion of the pressing operation and free from uncombined water and the gilsonite penetrates the voids in said cement base resulting from its hydration.

4. The process of making molded cementitious bodies which consists in admixing without the application of extraneous heat a cementitious base, an inert filler and a fibrous binder with water in excess of that required to effect hydration of said base and adding to said admixture pre-determined amounts of filler, fibre and a pulverized solid hydrocarbon compound, extruding the mass so mixed, applying pressure to a pre-determined length of said extruded mass to form a mat and subjecting said mat when confined to gradually increasing heat and pressure in an amount adequate to elevate the internal temperature of said confined mat to a point above the boiling point of water to convert the uncombined excess water into a vapor which accelerates the complete hydration of the base and subsequently raising the temperature of said mat to a point at least equal to the melting point of said hydrocarbon compound while continuing to apply pressure to said mat whereby the same is consolidated into a compact homogeneous non-hygroscopic solid in which the cementitious base is completely hydrated at the conclusion of the pressing operation.

5. The improved molded cementitious body which is substantially non-hygroscopic, involving a cementitious base which is substantially completely hydrated and free from uncombined water, said base being in intimate, adherent and homogeneous cohesion with an inert filler, fibrous material and a solid hydrocarbon having a melting point in excess of 212° F., the proportion of hydrocarbon in said body being less than 30% of the total mass, said filler, fibrous material and hydrocarbon being dispersed throughout the mass and said hydrocarbon penetrating the voids in said cementitious base resulting from its hydration, said body having the characteristics of one produced by subjecting a confined intimate admixture made at ordinary atmospheric temperature of the foregoing ingredients together with water in excess of that required to effect complete hydration of the cementitious base to gradually increasing heat and pressure in amount adequate to elevate the internal temperature of said confined admixture to a point above the boiling point of the water to convert the uncombined excess water into vapor which by penetration under pressure of the cementitious particles effects substantially complete hydration of the cementitious base while the confined admixture is undergoing the pressing operation, and by maintaining such application of heat and pressure until the uncombined excess water is driven off from said admixture and said admixture attains a final temperature not less than the melting point of the hydrocarbon and is consolidated into a compact homogeneous non-hygroscopic solid.

6. The improved molded cementitious body which is substantially non-hygroscopic, involving a cementitious base which is substantially completely hydrated and free from uncombined water, said base being in intimate, adherent and homogeneous cohesion with an inert filler, fibrous material and a solid hydrocarbon combined with a resinous flux and said combination having a melting point in excess of 212° F., the proportion of hydrocarbon in said body being less than 30% of the total mass, said filler, fibrous material and hydrocarbon being dispersed throughout the mass and said hydrocarbon and flux penetrating the voids in said cementitious base resulting from its hydration, said body having the characteristics of one produced by subjecting a confined intimate admixture made at ordinary atmospheric temperature of the foregoing ingredients together with water in excess of that required to effect complete hydration of the cementitious base to gradually increasing heat and pressure in amount adequate to elevate the internal temperature of said confined admixture to a point above the boiling point of the water to convert the uncombined excess water into vapor which by penetration under pressure of the cementitious particles effects substantially complete hydration of the cementitious base while the confined admixture is undergoing the pressing operation, and by maintaining such application of heat and pressure until the uncombined excess water is driven off from said admixture and said admixture attains a final temperature not less than the melting point of the hydrocarbon and is consolidated into a compact homogeneous non-hygroscopic solid.

7. The improved molded cementitious body which is substantially non-hygroscopic, involving a Portland cement base which is substantially completely hydrated and free from uncombined water, said base being in intimate, adherent and homogeneous cohesion with an inert filler, fibrous material and gilsonite, the proportion of gilsonite in said body being less than 30% of the total mass, said filler, fibrous material and gilsonite being dispersed throughout the mass and said gilsonite penetrating the voids in said cement base resulting from its hydration, said body having the characteristics of one produced by subjecting a confined intimate admixture made at ordinary atmospheric temperature of the foregoing ingredients together with water in excess of that required to effect complete hydration of said cement base to gradually increasing heat and pressure in amount adequate to elevate the internal temperature of said confined admixture to a point above the boiling point of the water to convert the uncombined excess water into vapor which by penetration under pressure of the cement particles effects substantially complete hydration of the cement base while the confined admixture is undergoing the pressing operation, and by maintaining such application of heat and pressure until the uncombined excess water is driven off from said admixture and said admixture attains a final temperature not less than the melting point of the hydrocarbon and is consolidated into a compact homogeneous non-hygroscopic solid.

8. The improved molded body which is substantially non-hygroscopic, involving a cementitious substance which is substantially completely hydrated and free from uncombined water, said body having incorporated therein in intimate, adherent and homogeneous cohesion, an inert filler, fibrous material and a hydrocarbon whose melting point was in excess of 212° F., the proportion of hydrocarbon in said body being less than 30% of the total mass, said hydrocarbon penetrating the voids in said body resulting from the hydration thereof, said body having the characteristics produced by subjecting a confined intimate admixture made at ordinary atmospheric temperature of the foregoing ingredients together with water in excess of that required to effect complete hydration of the cementitious substance to gradually increasing heat and pressure in amount adequate to elevate the internal temperature of said confined admixture to a point above the boiling point of the water and by maintaining such application of heat and pressure until the uncombined excess water is driven off from said admixture and said admixture attains a final temperature not less than the melting point of the hydrocarbon.

BRYAN F. BRICE.
PAUL B. BRICE.